Figure 1:
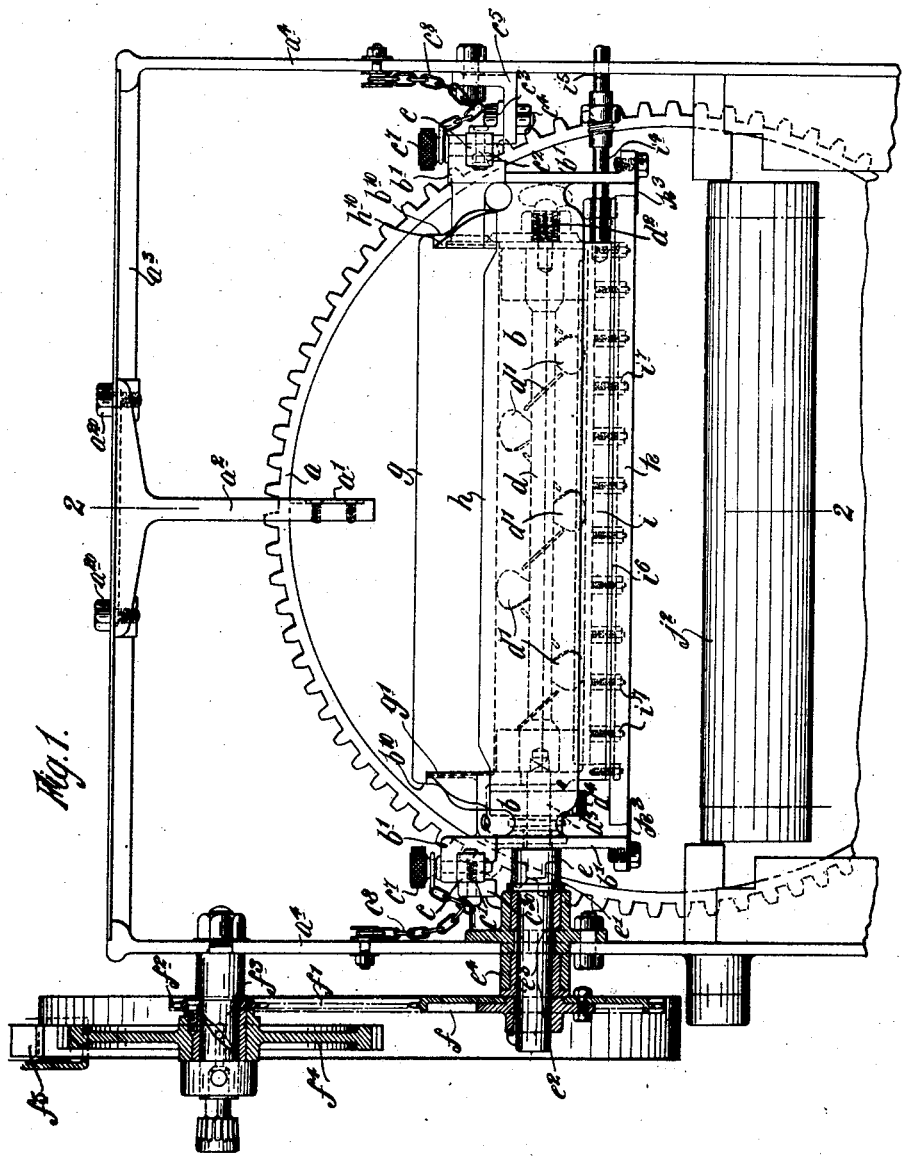

Oct. 6, 1925.
1,556,195

G. R. BAKER ET AL

APPARATUS FOR THE COATING OF CONFECTIONS AND THE LIKE

Filed June 9, 1923 2 Sheets-Sheet 1

Inventors
George Ralph Baker.
Ronald Head.

Attorney

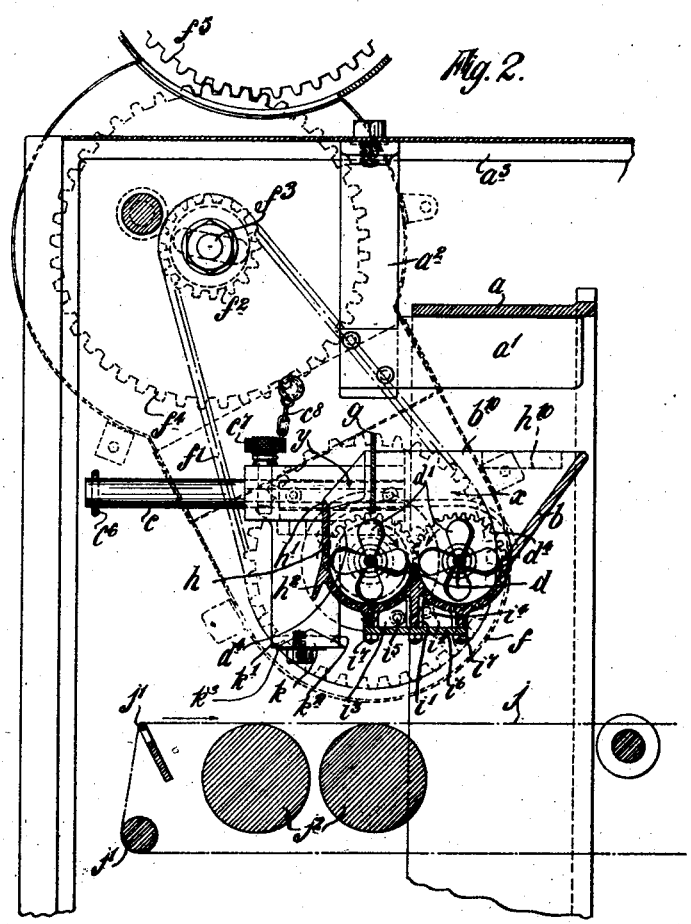

Patented Oct. 6, 1925.

1,556,195

UNITED STATES PATENT OFFICE.

GEORGE RALPH BAKER AND RONALD HEAD, OF LONDON, ENGLAND, ASSIGNORS TO JOSEPH BAKER SONS AND PERKINS COMPANY, INCORPORATED, OF WHITE PLAINS, NEW YORK.

APPARATUS FOR THE COATING OF CONFECTIONS AND THE LIKE.

Application filed June 9, 1923. Serial No. 644,327.

*To all whom it may concern:*

Be it known that we, GEORGE RALPH BAKER and RONALD HEAD, both of London, England, and subjects of the King of Great Britain and Ireland, have invented certain new and useful Improvements in Apparatus for the Coating of Confections and the like, of which the following is a specification.

This invention relates to the art of coating confections and the like and comprises improvements in apparatus of the type in which a coating substance, such as chocolate, is caused to flow in a cascade from a vessel in which coating substance is mixed right up to the time of flowing therefrom over the goods to be coated.

The present invention comprises primarily an improvement in the mixing vessel by providing same with a baffle or deflecting member adapted to cut off the inlet portion from the discharge portion thereof and compel said coating substance to take a substantially circuitous path before discharge from said vessel.

In certain cases it is desirable that the coating substance is of two different temperatures or consistencies, which are obtained by partly cooling or tempering a portion of said substance either in or previous to its entry to said vessel and mixing said partly cooled or tempered substance with other substance of higher temperature or more liquid consistency, this method resulting in the goods being coated with a material which wil set rapidly, and having a finish of high brilliancy, equal to or better than high class hand coated goods. For this latter purpose the invention further comprises, with the use of a vessel provided with a cooled or tempered part (as by jacketing same or providing other for reception or circulation of the cooling medium) the positioning of the baffle in such relation to the mixing means that the latter effects the complete and intimate mixture of the tempered and untempered portions of the coating substance by causing same to pass in close juxtaposition to the cooled or tempered part of the vessel before it is discharged.

The invention also comprises details of construction, arrangement and combination of parts all as hereinafter fully described and specifically pointed out in appended claims.

An embodiment of the invention is illustrated in the accompanying drawings in which Fig. 1 is a front elevation with parts in section, and Fig. 2 is a cross section on the line 2—2 of Fig. 1.

The invention is shown in said drawings as applied to part of a chocolate coating machine of a known kind, provided with a rotating drum $a$ which elevates the chocolate from a tank (not shown) in the base, from the interior of which drum, said chocolate is removed by means of a scraper $a^1$ extending into the drum and shown as carried by an arm $a^2$ secured by screws $a^{20}$ to the upper cross member $a^3$ connecting the side frame members $a^4$.

The chocolate removed from the drum as mentioned, falls into a mixing tank or vessel $b$ which can be mounted in the side frame members $a^4$ in any appropriate manner, but the preferred means is illustrated in the drawings and comprises lateral brackets $b^1$ which extend from the side walls $b^{10}$ of the vessel, said brackets being carried by longitudinal bars $c$ connected at one side by rivets $c^2$ to angle members $c^3$ attached by bolts $c^4$ to other angle brackets $c^5$ connected to the frame members $a^4$. At the other side the bars are connected by screws $c^1$ to a block $c^{30}$ attached to a casting $e^4$ hereinafter referred to. The brackets $b^1$ are slidable on the bars $c$ in order that the vessel can be withdrawn for cleaning. Stops shown as pins $c^6$ in the bars are provided so that the vessel can only be withdrawn to a limited extent. The vessel is normally retained in operative position on said bars by studs $c^7$ passed through the brackets into suitable holes in the bars, said studs being shown as connected to the frame members $a^4$ by means of chains $c^8$ to prevent their complete removal and consequent loss.

The vessel $b$ contains two mixing or stirring members, shown in the form of shafts $d$ carrying beaters $d^1$, each of these shafts being removably mounted at one end by means of a screw $d^2$ provided with a thumb piece to permit of ready removal and at the other end carried by a spindle $d^3$ supporting a gear wheel $d^4$, these gear wheels intermeshing in order that the shafts and paddles may be rotated in opposite directions. One of the spindles extends through the adjacent bracket $b^1$ and carries one member $e$ of a coupling, the other member $e^1$ of which is mounted on a drive shaft $e^2$ mounted in bearings $e^3$ in a casting $e^4$ supported by the frame member $a^4$. The drive shaft $e^2$ carries a sprocket wheel $f$ driven by chain $f^1$ from a sprocket wheel $f^2$ on a stub-shaft $f^3$ mounted in the frame $a^4$, said shaft also carrying a gear-wheel $f^4$ meshing with another gear-wheel $f^5$ forming one of the main driving elements of the machine.

All the above described features or details of construction and arrangement of parts are of an optional character and can be varied to suit requirements or conditions according to the type of machine in which the vessel $b$ is embodied or to which it may be applied.

The essential feature of the invention resides, as previously mentioned, in the provision within the mixing vessel $b$ of a baffle or deflecting member shown in the form of a plate $g$ extending for the entire width or longitudinal dimensions of the vessel $b$ and slidably mounted in grooves $g^1$ in the side walls of the vessel to permit of removal when required. This baffle plate extends within the vessel to such a depth as to be just clear of the path of the mixing device and also preferably extends, as shown, for a short distance above the walls of the vessel to avoid splashing or flow of the coating substance over the top thereof. In the case of a double mixing device as above described the baffle plate $g$, is placed above that mixing device which is nearer the discharge weir or portion $h$ of the vessel, this portion being lower than the remaining walls and being suitably bevelled at its upper edge as at $h^1$, and extended slightly outwards at its lower end in the form of an inclined rib $h^2$ to assist the flow of chocolate thereover. An ordinary overflow may be provided in one of the side walls at $h^{10}$.

The vessel $b$ is completed by the provision of a jacket $i$ for reception of a tempering or cooling medium, such as water, at the required temperature, the jacket being divided longitudinally by a partition $i^1$ which terminates short of one end so that water entering one compartment $i^2$ may flow for substantially the full length over this compartment round the end of the partition and then along the full length of the other compartment $i^3$, suitable pipes as $i^4$, $i^5$ being provided for the inlet and discharge of the water. The cooling or tempering medium is thus caused to circulate or flow uniformly back and forth in the compartments of the jacket to cool or temper that part of the vessel uniformly throughout. The walls constituting the jacket and partition are shown as cast in one with the vessel and the compartments closed by a removable cover $i^6$ secured by bolts $i^7$.

In the construction above described the mixing devices $d$, $d^1$ draw the coating substance downwards closely around or about the jacketed or cooled portion of the vessel $b$ from the inlet side $x$ of the baffle $g$ and assist in delivering it in thoroughly mixed condition to the other or discharge side $y$ of said baffle, where it flows over the weir $h$ to pass over the goods which are carried in the known manner on a conveyor $j$, as of open wire mesh, passing about suitable guides $j^1$ and over rollers $j^2$.

The invention further comprises other detail improvements, for example, the constitution of the overflow weir $h$ from the vessel $b$ by a plate or member adjustable as to height on the front wall of the vessel so that the level at which the discharge takes place may be varied according to requirements, as will be readily understood without further description or illustration, and the provision outside the vessel, and in the path of the overflowing coating substance, of dividing means shown in the form of a member $k$ having a doubly inclined upper surface $k^1$, $k^2$, carried by plates $k^3$ extending inward from the lower ends of the lateral brackets $b^1$. By provision of such dividing means the overflowing stream of chocolate is separated into two streams before it finally reaches the goods to be coated on the conveyor $j$, and in this way two coatings in succession are applied as the goods are moved along on said conveyor.

What we claim as our invention and desire to secure by Letters Patent of the United States is:—

1. In apparatus for the coating of confections and the like, the combination of a mixing vessel having separate inlet and discharge portions, means for supplying coating to said inlet portion, mixing and stirring means in the vessel and interposed between said inlet and outlet portions, and deflecting means cooperating with said mixing and stirring means to substantially cut off the inlet portion from the outlet portion and compel the coating to take a substantially circuitous path and be subjected to said mixing and stirring means before its discharge from said outlet portion.

2. In apparatus for the coating of confections and the like, the combination of a mixing vessel, means for cooling or tempering a portion thereof, mixing and stirring means in said vessel and a deflecting member located in such relation to the mixing means that the latter are caused to effect the complete and intimate mixture of tempered and untempered portions of the coating substance by compelling same to pass in close juxtaposition to said cooling or tempering means before it is discharged from the vessel.

3. In apparatus for the coating of confections and the like, the combination of a mixing vessel having an inlet portion and a discharge portion, duplex mixing and stirring means in said vessel and a deflecting member located adjacent that mixing device which is located adjacent the discharge portion of the vessel, whereby said discharge portion is cut off from direct communication from the inlet portion and the coating substances is compelled under the action of the mixing devices to take a substantially circuitous path before discharge from said vessel.

4. In apparatus for the coating of confections and the like, the combination of a container for the coating substance mixing and stirring means in said container, and a deflecting member slidably and removably mounted in said container and extending for the full longitudinal dimensions thereof, said deflecting member being located in such relation to the mixing and stirring means as to cut off the inlet portion of the container from the discharge portion thereof and compel the coating substance to take a substantially circuitous path before discharge from said vessel.

5. In apparatus for the coating of confections and the like, the combination of a container for the coating substance having side walls and a discharge overflow at a lower level than said walls, means for cooling a portion of said container containing a jacket divided into compartments positioned to ensure uniform flow of a cooling medium through said compartments, mixing means in said container, and a baffle plate located in such relation to the mixing device that the latter is caused to effect the complete and intimate mixture of cooled and uncooled portions of the coating substance to pass in close juxtaposition to said cooling means before discharge from the container.

6. In apparatus for the coating of confections and the like, the combination of a mixing vessel, mixing and stirring means therein a deflecting member located in such relation to the mixing means as to cut off the inlet portion of the vessel from the discharge portion thereof and compel the coating substance to take a substantially circuitous path before discharge from said vessel, and means for dividing the discharged coating substance into separated streams before reaching the goods to be coated.

7. In apparatus for the coating of confections and the like, the combination of a mixing vessel, means for cooling or tempering a portion thereof, mixing and stirring means in said vessel a deflecting member located in such relation to the mixing means that the latter are caused to effect the complete and intimate mixture of tempered and untempered portions of the coating substance by compelling same to pass in close juxtaposition to said cooling or tempering means before it is discharged from the vessel, and means for dividing the discharged coating substance into separated streams before reaching the goods to be coated.

8. In apparatus for the coating of confections and the like, the combination with a movable conveyor adapted to carry goods to be coated, a container for coating substance located above said conveyor, duplex rotatable mixing devices in said container, means for cooling a portion thereof, and a baffle plate located above that mixing device which is adjacent the discharge of the container.

9. In apparatus for the coating of confections and the like, the combination with a movable conveyor adapted to carry the goods to be coated, a container for coating substance located above said container and having a discharge at a lower level than the remainder of said container, means for conveying coating substance to that part of the container remote from the discharge, duplex rotatable mixing devices in said container, and a baffle plate located above that mixing device which is adjacent said discharge.

10. In apparatus for the coating of confections and the like, the combination with a movable conveyor adapted to carry the goods to be coated, a container for coating substance located above said container and having a discharge at a lower level than the remainder of said container, means for conveying coating substance to that part of the container remote from the discharge, duplex rotatable mixing devices in said container, means for cooling a portion of the container and a baffle plate located above that mixing device which is adjacent said discharge.

11. In apparatus for the coating of confections and the like, the combination with a movable conveyor adapted to carry the goods to be coated, a container for coating substance located above said container and having a discharge at a lower level than the remainder of said container, means for conveying coating substance to that part of the container remote from the discharge, duplex rotatable mixing devices in said container, means for cooling a portion of the container and a baffle plate located above that mixing device which is adjacent said discharge and means for dividing the substance flowing from said discharge into a plurality of streams before reaching the goods on the conveyor.

12. In apparatus for the coating of confections and the like, a flooding vessel having a closed bottom and an inlet for the coating material and arranged to discharge the coating solely by overflow, coating conditioning means in said vessel, and means for causing substantially all the coating to intercept said conditioning means before it can overflow from said vessel.

13. In apparatus for the coating of confections and the like, a flooding vessel having a closed bottom and an inlet for the coating material and arranged to discharge the coating solely by overflow, and coating conditioning means in said vessel located entirely below the level of said overflow.

14. In apparatus for the coating of confections and the like a flooding vessel arranged to discharge coating material entirely by overflow and at a predetermined level, a baffle associated with the vessel and extending downwardly below said level, and coating conditioning means in said vessel so located with relation to said baffle that substantially all the coating will be intercepted thereby before it can reach said overflow.

15. In apparatus for the coating of confections and the like, a flooding vessel having an inlet and outlet, means connected with said vessel for tempering the coating therein, and mechanical means for stirring the coating in said vessel, said stirring means being so located with respect to the walls of the vessel and its inlet and outlet as to intercept substantially all of the coating before it can reach said outlet.

16. In apparatus for the coating of confections and the like, a flooding vessel having an inlet and outlet, means connected with said vessel for tempering the coating therein, mechanical means for stirring the coating in said vessel, and means for causing substantially all the coating to intercept said stirring means before it can reach said outlet.

In witness whereof we have signed this specification.

GEORGE RALPH BAKER.
RONALD HEAD.